United States Patent [19]

Klotz et al.

[11] Patent Number: 5,559,161

[45] Date of Patent: Sep. 24, 1996

[54] HYDROXY-FUNCTIONAL TRIAMINE CATALYST COMPOSITIONS FOR THE PRODUCTION OF POLYURETHANES

[75] Inventors: Herbert C. Klotz; Kevin R. Lassila, both of Allentown; Mark L. Listemann, Whitehall; Kristen E. Minnich, Allentown; Ann C. L. Savoca, Bernville, all of Pa.

[73] Assignee: Air Products and Chemicals, Inc., Allentown, Pa.

[21] Appl. No.: 198,925

[22] Filed: Feb. 18, 1994

[51] Int. Cl.$^6$ .................. C08J 9/00; C08K 5/16
[52] U.S. Cl. .................. 521/129; 521/128; 526/904; 502/167; 502/172; 502/200
[58] Field of Search .................. 521/129, 128; 526/904; 502/167, 172, 200

[56] References Cited

U.S. PATENT DOCUMENTS

| | | | |
|---|---|---|---|
| 3,836,488 | 9/1974 | Pruitt et al. | 260/2.5 AC |
| 4,026,840 | 5/1977 | Bechara et al. | 260/2.5 AC |
| 4,040,591 | 9/1977 | McEntire et al. | 260/2.5 AC |
| 4,101,466 | 7/1978 | McEntire et al. | 521/115 |
| 4,101,470 | 7/1978 | McEntire | 521/118 |
| 4,143,003 | 3/1979 | Haas et al. | 521/129 |
| 4,143,071 | 3/1979 | McEntire et al. | 260/561 A |
| 4,175,097 | 11/1979 | McEntire | 260/570.5 P |
| 4,338,408 | 7/1982 | Zimmerman et al. | 521/115 |
| 4,433,170 | 2/1984 | Zimmerman et al. | 564/508 |
| 4,957,944 | 9/1990 | Schiffauer et al. | 521/115 |
| 5,039,713 | 8/1991 | Petrella | 521/129 |
| 5,064,957 | 11/1991 | Nakasugi | 544/86 |
| 5,071,809 | 12/1991 | Casey et al. | 502/155 |
| 5,091,583 | 2/1992 | Casey et al. | 564/461 |
| 5,229,430 | 7/1993 | Tamano et al. | 521/129 |
| 5,374,666 | 12/1994 | Tamano et al. | 521/129 |

FOREIGN PATENT DOCUMENTS 0469545 7/1991 European Pat. Off. .

OTHER PUBLICATIONS

N. Malwitz, et al. *J. Cell. Plastics*, 1987, vol. 23, pp. 461–502.

*Primary Examiner*—James J. Seidleck
*Assistant Examiner*—Duc Truong
*Attorney, Agent, or Firm*—Michael Leach; William F. Marsh

[57] ABSTRACT

A method for preparing a polyurethane foam which comprises reacting an organic polyisocyanate and a polyol in the presence of a blowing agent, a cell stabilizer and a catalyst composition consisting essentially of a compound of structure I

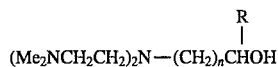

wherein
R is hydrogen, a $C_1$–$C_4$ alkyl, $C_6$–$C_8$ aryl, or $C_7$–$C_9$ aralkyl group; and
n is 1 to 8

22 Claims, No Drawings

HYDROXY-FUNCTIONAL TRIAMINE CATALYST COMPOSITIONS FOR THE PRODUCTION OF POLYURETHANES

TECHNICAL FIELD

The present invention relates to the use of hydroxyl-containing tertiary amines as catalysts for producing polyurethanes.

BACKGROUND OF THE INVENTION

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. The discovery that CFC's deplete ozone in the stratosphere has resulted in mandates diminishing CFC use. Production of water-blown foams, in which blowing is performed with $CO_2$ generated by the reaction of water with the polyisocyanate, has therefore become increasingly important. Tertiary amine catalysts are typically used to accelerate blowing (reaction of water with isocyanate to generate $CO_2$) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam, this time characterized by high density, broken or poorly defined cells, or other undesirable features, will be produced.

Tertiary amine catalysts generally are malodorous and offensive and many have high volatility due to low molecular weight. Release of tertiary amines during foam processing may present significant safety and toxicity problems, and release of residual amines from consumer products is generally undesirable.

Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents. Examples of such structures are included in the following references: U.S. Pat. Nos. 4,957,944; 5,071,809 and 5,091,583.

Secondary alcohols are preferred in the structures, because these catalysts exhibit a desirable balance between their promotion of the active hydrogen-isocyanate reactions and their own reactivity with isocyanates. In contrast, catalysts which contain primary alcohols react rapidly with isocyanates and thus high use levels are required. Catalysts which contain tertiary hydroxyls react slowly with isocyanates, but the urethanes of tertiary hydroxyls which are formed have poor thermal stability. These urethanes may degrade and release the catalyst at temperatures substantially below the decomposition temperature of the foam itself. The free amine could then accelerate foam decomposition.

A catalyst which strongly promotes the water-isocyanate (blowing) reaction is advantageous for the manufacture of many polyurethane foams. Such catalysts include the β-(N,N-dimethylamino)alkyl ethers, in particular bis(dimethylamino)ethyl ether. Low odor, reactive catalysts structurally related to bis(dimethylamino)ethyl ether are described in U.S. Pat. Nos. 4,338,408 and 4,433,170. In particular, 2-[N-(dimethylaminoethoxyethyl)-N-methylamino] ethanol, Texacat® ZF-10 catalyst, is an effective blowing catalyst, albeit less effective than bis(dimethylamino)ethyl ether.

Linear, permethylated di-, tri-, and polyamines are also known to promote the water-isocyanate reaction.

U.S. Pat. No. 3,836,488 discloses the use of tris[2-(dimethylamino)ethyl]amine as a catalyst for making urethanes by reacting polyisocyanate with active hydrogen containing compounds.

U.S. Pat. No. 4,143,003 discloses a process for the production of polyurethane foam resins in which linear polyamines containing at least 4 tertiary nitrogen atoms are used as catalysts. Such catalysts include hexamethyltriethylenetetramine and heptamethyltetraethylenepentamine.

U.S. Pat. No. 5,039,713 discloses a blowing catalyst consisting essentially of 25 to 80 wt % pentamethyldiethylenetriamine and 20 to 75 wt % bis(dimethylaminopropyl)methylamine.

U.S. Pat. No. 4,026,840 discloses that the reaction of isocyanate with polyols to form polyurethanes and their polymerization to polyisocyanurates are promoted by certain hydroxyalkyl tertiary amine catalysts corresponding to the formula:

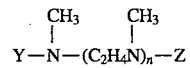

wherein

Y is $CH_3$ or Z,

Z is $-CH_2CH_2OH$, and n is 1 or 2.

EP 0 469 545 A2 (U.S. Pat. No. 5,229,430) discloses an amine catalyst for producing polyurethane comprising a compound of the general formula:

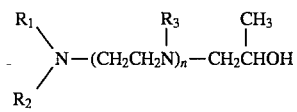

wherein $R_1$, $R_2$ and $R_3$ respectively and independently are alkyl groups having 1 to 3 carbon atoms, and n is an integer from 0 to 3.

The amine catalyst has a secondary hydroxyl group in the molecule and is claimed to be non-bleeding in the polyurethane resin.

Alkylene oxide adducts of polyamines are also used as polyols for the production of polyurethanes.

U.S. Pat. No. 5,064,957 discloses the hexakis propylene oxide adduct of tris(2-aminoethyl)amine as a precursor to the morpholine-containing polyurethane catalyst, but the propylene oxide adduct itself is not noted as having catalytic activity.

N. Malwitz, et al, *J. Cell. Plastics*, 1987, vol 23, pp 461–502, compared Me$_2$NCH$_2$CH$_2$N(Me)CH$_2$CH$_2$OH and Me$_2$NCH$_2$CH$_2$N(Me)CH$_2$ CH$_2$CH$_2$OH and found that the hydroxypropyl group shifted the selectivity toward gelling.

SUMMARY OF THE INVENTION

The present invention provides a composition for catalyzing the trimerization of an isocyanate and the reaction between an isocyanate and a compound containing a reactive hydrogen, e.g., the blowing reaction and the urethane reaction for making polyurethane. The catalyst composition consists essentially of a compound having the following formula I:

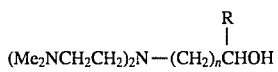

wherein

R is hydrogen, a C$_1$–C$_4$ alkyl, C$_6$–C$_8$ aryl, or C$_7$–C$_9$ aralkyl group; and n is an integer from 1 to 8.

The advantage of these catalysts is that activities and selectivities are variable and they vary in a systematic fashion. Blowing selectivity increases as the number of carbon atoms between the hydroxyl group and the central nitrogen increases, allowing the catalyst characteristics to be more easily optimized for a specific application. An alteration in selectivity based on this structural feature has not been previously appreciated. Furthermore, the activity of the hydroxypropyl derivative (n=1; R=Me) is significantly higher than that of the terminally propoxylated permethyldiethylenetriamine isomer of the prior art. The art suggests that variation of the activity of functional tertiary amine catalysts can be achieved by diminishing alcohol reactivity or by increasing the number of tertiary nitrogen atoms in the catalyst. A difference in the activity of these two isomers is therefore unexpected.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylenediisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A general polyurethane flexible foam formulation having a 1–3 lb/ft$^3$ (16–48 kg/m$^3$) density (e.g., automotive seating) containing a gelling catalyst such as triethylenediamine (TEDA) and a blowing catalyst such as the catalyst composition according to the invention would comprise the following components in parts by weight (pbw):

| Flexible Foam Formulation | pbw |
| --- | --- |
| Polyol | 20–100 |
| Polymer Polyol | 80–0 |
| Silicone Surfactant | 1–2.5 |
| Blowing Agent | 2–4.5 |
| Crosslinker | 0.5–2 |
| Catalyst | 0.5–2 |
| Isocyanate Index 70–115 | |

The blowing catalyst composition consists essentially of a compound represented by formula I.

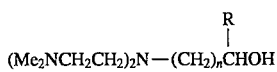

where
R is hydrogen, $C_1$–$C_4$ alkyl, $C_6$–$C_8$ aryl, or $C_7$–$C_9$ aralkyl group and n is 1 to 8; R is preferably hydrogen or an alkyl group, and is especially methyl; n is preferably 1 to 3, especially 2 or 3.

Compounds of formula I are generally prepared by the reaction of N,N,N'',N''-tetramethyldiethylenetriamine with alkylene oxides or with suitable lactones followed by reduction of the carbonyl.

A catalytically effective amount of the catalyst composition is used in the polyurethane formulation. More specifically, suitable amounts of the catalyst composition may range from about 0.01 to 10 parts per 100 parts polyol (phpp) in the polyurethane formulation.

The catalyst composition may be used in combination with other tertiary amine, organotin and carboxylate urethane catalysts well known in the urethane art.

The catalyst compositions of the invention unexpectedly exhibit blowing selectivities which increase as the number of methylene groups between the central nitrogen and the hydroxyl group increases. This provides a convenient means of optimizing the catalyst characteristics required for a specific application. Furthermore, the activity of the hydroxypropyl derivative (n=1; R=Me) is significantly higher than that of the terminally propoxlylated permethyldiethylenetriamine isomer of the prior art. A difference in the activity of two isomers is unexpected.

EXAMPLE 1

N,N,N'',N''-Tetramethyldiethylenetriamine (TMDETA)

A 2 L stainless steel autoclave was charged with Raney® 2800 nickel catalyst (28.22 g), water (20.7 g) and N,N-dimethylethylenediamine (DMEDA, 445.9 g, 5.058 mole). The reactor was sealed and pressure checked, and three pressure vent cycles with nitrogen and hydrogen were performed. The reactor was pressured to 500 psi (3447 kPa) with hydrogen and the reaction mixture was heated to 120° C. The hydrogen pressure was increased to 750 psi (5171 kPa) and distilled N,N-dimethylaminoacetonitrile (DMAAcN) was admitted by means of an HPLC pump at a rate of 1.5 mL/min until 415 g (4.933 mole) has been charged in the reactor. The total addition time was 5 hours. Hydrogen uptake continued for 4 hours after the nitrile addition had been completed. GC analysis of the product showed that N,N,N'',N''-tetramethyldiethylenetriamine constituted 20% of the product; the remainder was N,N-dimethylethylenediamine (66%) and other byproducts (12%).

A second run was performed in an analogous fashion except that the reaction pressure was 1200 psi (8274 kPa). Hydrogen uptake stopped as soon as the nitrile addition had been completed. GC analysis showed that reaction product contained 32% N,N,N'',N''-tetramethyldiethylenetriamine (64% selectivity based on DMAAcN), 63% N,N-dimethylethylenediamine, and 1% other byproducts.

The two reaction products (1415 g) were combined in a 3 L round-bottomed flask and distilled through a 40"×1" (102×2.54 cm) id Propack® column. DMEDA and low boiling impurities (837 g) were removed at 20 torr (2.67 kPa) and 49° C. Approximately 150 g were lost through the pump. The remaining material (409 g) was transferred to a 1 L flask and distilled at 100 torr (13.3 kPa). N,N,N'',N''-tetramethyldiethylenetriamine boiled at 128° C. A total of 271 g was collected. The identity of the product was established by $^1$H and $^{13}$C NMR.

EXAMPLE 2

N,N,N'',N''-Tetramethyl-N'-2-hydroxypropyldiethylenetriamine (TMHPDETA)

N,N,N'',N''-Tetramethyldiethylenetriamine (TMDETA, 24.96 g, 157.2 mmole) and propylene oxide (PO, 9.1 g, 157.0 mmole) were charged to a 50 mL autoclave. The reactor was sealed, the contained air was replaced with nitrogen, the reactor was pressured to 100 psi (689 kPa) with nitrogen, and the contents were heated to 120° C. Analysis of samples withdrawn after 6 and 22 hours showed that little change in composition had occurred after the first 6 hours. After 22 hours, the reaction mixture was cooled to ambient temperature and the product was removed. GC analysis of the crude product showed that it contained 4.8% unreacted TMDETA and 82.3% TMHPDETA.

A second run was performed using 14.88 g (93.7 mmole) of TMDETA and 8.28 (142.9 mmole) of PO. GC analysis after 23 hours showed that the reaction mixture contained 10.4% unreacted TMDETA and 82.2% TMHPDETA. The combined crude products were purified by vacuum distillation using a Vigreux column. The unreacted starting amine boiled at 82° C. (0.24 torr; 0.032 kPa); N,N,N'',N''-tetramethyl-N'-(2-hydroxypropyl)diethylenetriamine boiled at 110° C. (0.125 torr; 0.0167 kPa). TMHPDETA was identified by $^1$H and $^{13}$C NMR and mass spectrometry.

EXAMPLE 3

N,N,N'',N''-Tetramethyl-N'-3-hydroxybutyldiethylenetriamine (TMHBDETA)

β-Butyrolactone (5.28 g, 61.4 mmole) was added at a rate of 1.2 mL/hr to a flask containing TMDETA (10.0 g, 65.5 mmole) heated to 100° C. Samples were withdrawn periodically for GC analysis. After 5 hours the concentration of N,N,N'', N''-tetramethyldiethylenetriamine-N'-3-hydroxybutyramide had reached 70%. The reaction was discontinued and the product was isolated by shortpath vacuum distillation (bp 145° C., 0.2 torr; 0.0267 kPa). The amide was identified by GCMS.

Lithium aluminum hydride (26 mL, 1M solution in THF, 26 mmole) was charged to a nitrogen-purged, oven-dried flask. A solution of the butyramide (6.38 g, 25.9 mmole) in THF (25 mL) was added at a rate of 0.37 mL/min to the LiAlH$_4$ solution heated to 63° C. After the addition was completed, the solution was stirred for an additional 15 minutes and the LiAlH$_4$ was deactivated by successively adding water (1.12 g), 15% NaOH (1.14 g) and water (3.42 g). The resulting solids were removed by vacuum filtration and the amine (1.83 g) was isolated from the filtrate by Kugelrohr distillation at 94° C. and 85 millitorr (0.0113 kPa). TMHBDETA was identified by nuclear magnetic resonance and mass spectrometry.

EXAMPLE 4

N,N,N'',N''-Tetramethyl-N'-4-hydroxyamyldiethylenetriamine (TMHADETA)

TMDETA (10.0 g, 63.0 mmole), γ-valerolactone (63.4 mmole) and titanium (IV) isopropoxide (2.13 g, 7.5 mmole) were weighed into a 100 mL flask. The flask was fitted with a nitrogen inlet, reflux condenser, and thermometer, and the contents were heated to 100° C. Samples removed periodically for GC analysis showed that the reaction was complete after 24 hours. The reaction mixture was cooled and the catalyst was deactivated by adding water (5 mL) and diethyl ether (10 mL) to the reaction vessel. The ether was removed and the amide (3.2 g) was isolated from the resulting solids by Kugelrohr distillation (bp 162° C., 0.4 torr; 0.053 kPa). The product was identified by GCMS.

The amide could also be prepared by the following alternate procedure: TMDETA (37.2 g, 234 mmole) was added dropwise to a flask containing water (6.46 g, 359 mmole) and γ-valerolactone (35.9 g, 359 mmole). The reaction mixture was heated at 100° C. for 18 hours. GC analysis showed that the concentration of amide was no longer changing significantly. The unreacted TMDETA and lactone were removed by short path distillation. Kugelrohr distillation (bp 140° C., 0.3 torr; 0.040 kPa) afforded 9.7 g of amide of 79% purity.

A solution of the amide (2.79 g, 10.8 mmole) in THF (15 mL) was added via syringe over a period of about 1 hour to a solution of LiAlH$_4$ (11 mL, 1M solution in THF, 11 mmole) heated to 63° C. in an oven-dried, nitrogen-purged flask. After the addition had been completed, the LiAlH$_4$ was deactivated by careful addition of water (0.47 g), 15% NaOH (0.47 g) and water (1.28 g). Removal of the resulting solids by vacuum filtration and distillation of the filtrate afforded TMHADETA (bp 120° C., 0.33 torr; 0.044 kPa). The product was identified by nuclear magnetic resonance and mass spectrometry.

COMPARATIVE EXAMPLE 1

N-(2-Hydroxypropyl)-N,N',N",N" -tetramethyldiethylenetriamine (Me$_4$DETA-PO)

Diethylenetriamine (1000 g, 9.695 mole) was heated to 60° C. in 1 liter round-bottomed flask. The flask was fitted with a thermometer and a reflux condenser. Propylene oxide (510 mL, 7.288 mole) was added in 25 mole % increments using a pump. The reaction was monitored by GC to maximize the yield of monopropoxylate. The unreacted starting material was removed by distillation at 85° C. head temperature, 2 torr (0.267 kPa). The monopropoxylated product distilled at 125° C. head temperature, 2 torr (0.267 kPa). The monopropoxylated product was an inseparable mixture of terminally and internally monopropoxylated diethylenetriamine in a 4:1 ratio.

Monopropoxylated diethylenetriamine (150 g), palladium on carbon (8.02 g) and water (100 g) were charged to a 1 liter stainless steel autoclave reactor. The reactor was sealed and purged three times with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5516 kPa). An HPLC pump was primed and attached to the reactor. The pump was used to add the Formalin® reagent (270 g, 37% formaldehyde in water) to the reactor at 3 mL/minute. When the equivalent amount of formaldehyde was added, the hydrogen uptake stopped, indicating the reaction was complete. After the reaction, water was pumped into the reactor to rinse the formaldehyde from the feed lines. The hydrogen feed was shut off and the reactor was cooled. It was then vented and purged with nitrogen. The catalyst was removed by filtering through Celite® filter aid.

Water was removed from the filtrate at atmospheric pressure. Distillation through a one foot (30.5 cm) packed column at a head temperature of 85° C. and pressure of 2 torr (0.267 kPa) afforded the product. The product is an inseparable mixture of the permethylated terminal and internal monopropoxylates in a 78:22 ratio (Me$_4$DETA-PO).

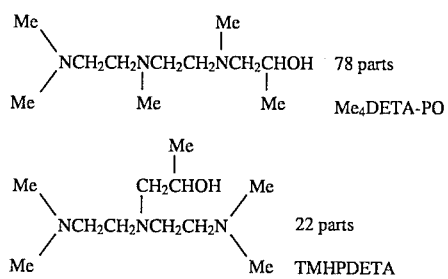

EXAMPLE 5

A general and quantitative technique for measuring catalyst activity and selectivity was used in this example. The rate of isocyanate consumption as a function of time was measured using a formulation similar to that of Example 6, but containing monofunctional reactants. Reaction samples withdrawn at the indicated times were quenched with dibutylamine and analyzed by liquid chromatography. The catalysts were compared on an equimolar basis corresponding to a loading of 0.35 pphp DABCO® 33LV catalyst (33 wt % triethylenediamine in dipropylene glycol) in an actual foam, illustrated by Example 6.

Relative catalyst activity can be determined by comparison of the % NCO conversion data. Catalyst selectivity is defined as the ratio of the normalized amount of blowing (urea formation) to the normalized amount of gelling (urethane formation). A selectivity of 1.0 means that the normalized amounts of blowing and gelling are equal at that point in the reaction. A selectivity substantially below 1.0, for example about 0.3, is indicative of a strong gelling catalyst. A selectivity greater than 1.0 is indicative of a strong blowing catalyst. In practice, the function of the blowing catalyst is to counterbalance the activity of a strongly gelling catalyst such as triethylenediamine (TEDA). Thus in practical terms, any catalyst which exhibits a selectivity significantly higher than 0.3 can be used as a blowing catalyst to counterbalance a strong gelling catalyst such as TEDA.

The results set forth in Table 1 show that significant differences in blow to gel selectivity are observed with these new catalysts. Moving the hydroxyl group further from the central nitrogen improves the blowing selectivity, especially in the early stages of the reaction. This type of structural sensitivity has not been previously observed and is unexpected.

TABLE 1

| Catalyst | | Time (min) | | | | | | | | | |
|---|---|---|---|---|---|---|---|---|---|---|---|
| | | 0.5 | 1.0 | 1.5 | 2.0 | 3.0 | 4.0 | 5.0 | 6.0 | 7.0 | 8.0 |
| TMHPDETA | Conversion | 12.1 | 25.1 | 34.9 | 45.5 | 58.3 | 67.7 | 74.1 | 84.7 | 89.7 | 91.5 |
| (n = 1) | Selectivity | 0.64 | 0.68 | 0.71 | 0.73 | 0.75 | 0.75 | 0.72 | 0.66 | 0.69 | 0.74 |
| TMHBDETA | Conversion | 13.3 | 24.7 | 34.9 | 44.1 | 54.5 | 61.7 | 66.4 | 69.6 | 71.8 | 73.4 |
| (n = 2) | Selectivity | 0.68 | 0.72 | 0.73 | 0.73 | 0.72 | 0.69 | 0.67 | 0.68 | 0.67 | 0.67 |
| TMHADETA | Conversion | 13.3 | 24.1 | 33.8 | 42.0 | 54.9 | 62.7 | 67.7 | 71.1 | 73.4 | 75.6 |
| (n = 3) | Selectivity | 0.80 | 0.83 | 0.84 | 0.82 | 0.81 | 0.78 | 0.76 | 0.74 | 0.74 | 0.73 |

EXAMPLE 6

In this example a polyurethane foam was prepared in a conventional manner. The polyurethane formulation in parts by weight was:

| COMPONENT | PARTS |
|---|---|
| E-648 | 60 |
| E-519 | 40 |
| DC-5043 | 1.5 |
| Diethanolamine | 1.49 |
| Water | 3.5 |
| TDI 80 | 105 Index |

E-648 - a conventional, ethylene oxide tipped polyether polyol marketed by Arco
E-519 - a styrene-acrylonitrile copolymer filled polyether polyol marketed by Arco
DABCO DC-5043 - silicone surfactant marketed by Air Products and Chemicals, Inc.
TDI 80 - a mixture of 80 wt % 2,4-TDI and 20 wt % 2,6-TDI The foam reactivity was measured using either 0.60 g of TMHPDETA (99% purity; 2.75 mmole) or 0.73 g of TMHA-DETA (95% purity; 2.75 mmole) as catalyst. For each foam, the catalyst (as specified in Table 2) was added to 85.2 g of above premix in a 5" (12.7 cm) diameter by 10" (25.4 cm) tall paper can and the formulation was well mixed for 20 sec. Sufficient TDI 80 was added to make a 105 index foam [index= (mole NCO/mole active hydrogen)×100] and mixed well for 4 sec. The foam was allowed to rise freely, monitoring foam height and carbon dioxide evolution with time. Table 2 sets forth conditions and results.

TABLE 2

| Time (sec.) | TMHPDETA | TMHADETA | TMHPDETA | THHADETA |
|---|---|---|---|---|
| | $CO_2$ evolved (g) | | Foam Height (mm) | |
| 13 | 2.77 | 3.90 | 4.3 | 6.2 |
| 19 | 3.95 | 5.33 | 6.5 | 8.6 |
| 31 | 5.30 | 6.31 | 9.3 | 10.9 |
| 43 | 5.90 | 6.92 | 10.5 | 11.6 |
| 49 | 6.13 | 7.06 | 10.8 | 11.8 |
| 67 | 6.49 | 7.18 | 11.3 | 12.1 |
| 85 | 6.70 | 7.37 | 11.6 | 12.0 |
| 103 | 6.85 | 7.36 | 11.7 | 12.0 |
| 121 | 6.94 | 7.42 | 11.7 | 12.0 |
| 139 | 7.00 | 7.43 | 11.8 | 11.9 |
| 157 | 7.05 | 7.43 | 11.7 | 11.8 |
| 175 | 7.08 | 7.57 | 11.7 | 11.8 |

As these data indicate, the TMHADETA foam shows more $CO_2$ evolution and greater volume (as indicated by foam height) than the TMHPDETA foam. This is consistent with the results given in Table 1, which show that TMHADETA has greater selectivity for blowing than TMHPDETA.

EXAMPLE 7

The relative activities of the $Me_4DETA$-PO catalyst of the prior art and the pure, internally propoxylated material TMHPDETA, were compared using the procedure of Example 5. As discussed in Example 5, the relative activities of catalysts can be ascertained by comparison of their respective % NCO conversion data.

Comparison of the relative activity of $Me_4DETA$-PO with that of TMHPDETA in Table 3 shows that the new, internally propoxylated material, has significantly higher activity than the prior art catalyst. Based on the teachings of the prior art, it is not expected that two isomers would have such different performance.

TABLE 3

| Catalyst | | Time (min) | | | | | | | | | |
|---|---|---|---|---|---|---|---|---|---|---|---|
| | | 0.5 | 1.0 | 1.5 | 2.0 | 3.0 | 4.0 | 5.0 | 6.0 | 7.0 | 8.0 |
| Me$_4$DETA-PO | Conversion | 9.0 | 19.8 | 27.1 | 34.1 | 47.5 | 56.5 | — | 66.4 | — | 72.1 |
| Comp Ex 1 | Selectivity | 0.72 | 0.77 | 0.79 | 0.79 | 0.79 | 0.77 | — | 0.76 | — | 0.78 |
| TMHPDETA | Conversion | 12.1 | 25.1 | 34.9 | 45.5 | 58.3 | 67.7 | 74.1 | 84.7 | 89.7 | 91.5 |
| (n = 1) | Selectivity | 0.64 | 0.68 | 0.71 | 0.73 | 0.75 | 0.75 | 0.72 | 0.66 | 0.69 | 0.74 |

We claim:

1. In a method for catalyzing the trimerization of an isocyanate and/or the reaction of an isocyanate with an active hydrogen-containing compound, the improvement which comprises employing a catalyst composition consisting essentially of a compound selected from the group consisting of compounds of the following formula

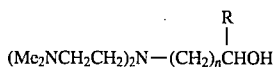

wherein R is a $C_1$–$C_4$ alkyl, $C_6$–$C_8$ aryl, or $C_7$–$C_9$ aralkyl group and n is 1 to 8.

2. The method of claim 1 in which the compound is defined by R being methyl and n being 1 to 8.

3. The method of claim 1 in which n is 2 or 3.

4. The method of claim 2 in which n is 1 to 3.

5. The method of claim 2 in which n is 2 or 3.

6. The method of claim 1 in which the catalyst composition is used in combination with a tertiary amine, an organotin or a carboxylate urethane catalyst.

7. In a method for preparing a polyurethane foam which comprises reacting an organic polyisocyanate and a polyol in the presence of water as a blowing agent, a cell stabilizer and a catalyst composition, the improvement which comprises employing a catalyst composition consisting essentially of a compound selected from the group of compounds of the following formula

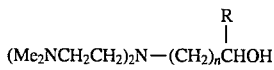

wherein R is a $C_1$–$C_4$ alkyl group and n is 1 to 8.

8. The method of claim 7 in which the compound is defined by R being methyl and n being 1 to 8.

9. The method of claim 7 in which n is 2 or 3.

10. The method of claim 8 in which n is 1 to 3.

11. The method of claim 8 in which n is 2 or 3.

12. The method of claim 7 in which the catalyst composition is used in combination with another tertiary amine, an organotin or a carboxylate urethane catalyst.

13. The method of claim 11 in which the catalyst composition is used in combination with another tertiary amine, an organotin or a carboxylate urethane catalyst.

14. A catalyst composition consisting essentially of a compound selected from the group consisting of compounds of the following formula

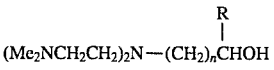

wherein R is a $C_1$–$C_4$ alkyl, $C_6$–$C_8$ aryl, or $C_7$–$C_9$ aralkyl group and n is 1 to 8.

15. The catalyst composition of claim 14 in which n is 2 or 3.

16. The catalyst composition of claim 14 in which the compound is defined by R being methyl and n being 1 to 3.

17. The catalyst composition of claim 16 in which n is 2 or 3.

18. The catalyst composition of claim 16 in which n is 2.

19. The catalyst composition of claim 14 in which the catalyst composition also contains a tertiary amine, an organotin or a carboxylate urethane catalyst.

20. The catalyst composition of claim 16 in which the catalyst composition also contains a tertiary amine, an organotin or a carboxylate urethane catalyst.

21. The catalyst composition of claim 17 in which the catalyst composition also contains a tertiary amine, an organotin or a carboxylate urethane catalyst.

22. The catalyst composition of claim 18 in which the catalyst composition also contains a tertiary amine, an organotin or a carboxylate urethane catalyst.

* * * * *